US007403272B1

(12) United States Patent
Soramae

(10) Patent No.: US 7,403,272 B1
(45) Date of Patent: Jul. 22, 2008

(54) METHOD AND DEVICE FOR THE DETECTION OF COUNTERFEIT DOCUMENTS AND BANKNOTES

(75) Inventor: Valentino Soramae, Arqua Polesine (IT)

(73) Assignee: NUMEROUNO Ricerche S.r.l., Vimercate (MI) (IT)

(*) Notice: Subject to any disclaimer, the term of this patent is extended or adjusted under 35 U.S.C. 154(b) by 0 days.

(21) Appl. No.: 11/497,451

(22) Filed: Aug. 2, 2006

(30) Foreign Application Priority Data

Aug. 4, 2005 (IT) .......................... PC2005A0045

(51) Int. Cl.
*G06K 9/74* (2006.01)

(52) U.S. Cl. ........................................................ 356/71

(58) Field of Classification Search .................... 356/71
See application file for complete search history.

(56) References Cited

U.S. PATENT DOCUMENTS 7,119,900 B2 * 10/2006 Okumura et al. ............ 356/364

FOREIGN PATENT DOCUMENTS

GB 1151271 2/1967
WO WO 03/084767 10/2003
WO WO 2004/013817 2/2004

OTHER PUBLICATIONS

Coombs et al., Improved Verification Methods for OVI™ Security Ink. (2000) Optical Security and Counterfeit Deterrence Techniques III, vol. 3973, pp. 296-303.

* cited by examiner

*Primary Examiner*—Michael P Stafira
(74) *Attorney, Agent, or Firm*—Young & Thompson

(57) ABSTRACT

A method and device for the identification of documents and banknotes marked with Optical Variable Inks providing: generating a white light ray between 5,000° and 7,000° K; polarizing that white light ray through a first polarizing filter (3), and sending the polarized ray (4) onto an area (5) to be assessed; filtering the ray (6) reflected the area (5) to be assessed by a second polarizing filter (7), in phase consistency with the first polarizing filter (3) and getting a first signal ($s_a$); filtering the ray (6) reflected by the area (5) to be assessed by a third polarizing filter (8), in anti-phase with the first polarizing filter (3), and getting a second signal ($s_b$); measuring the difference Δ between these two signals; comparing the calculated value Δ to a reference value $\Delta_r$ previously measured on genuine documents and banknotes.

16 Claims, 2 Drawing Sheets

METHOD AND DEVICE FOR THE DETECTION OF COUNTERFEIT DOCUMENTS AND BANKNOTES

This invention relates to a method and the relevant device used to implement such a method, for the identification of documents and banknotes marked with OVI™ inks (Optical Variable Inks). For their identification, such a device uses polarized light.

The counterfeiting of printed documents, especially banknotes, is a widespread practice and fraud preventing measures are constantly assessing new methods to detect forgeries.

To detect counterfeit banknotes, these are examined backlight to verify the presence of both the watermark and of the security metallic thread.

Or, holographic foil strips are examined, since they have the characteristic of showing different images according to different inclinations through which they are observed.

Other methods include specific types of printing which allow ultra-slim lines to be obtained, which cannot be detected by normal scanners or photocopy machines. Still others include the use of special fluorescent metallic inks which can be highlighted by ultra-violet light. Magnetic inks are also used to write serial numbers which can be read by a suitable device.

A method for marking banknotes that has stood out relates to the use of the so-called OVI™ (Optical Variable Inks), which have the characteristic of changing colour according to the different angle of inclinations through which they are observed. This characteristic is due to interference, absorption, and reflection light phenomena in multilayer-pigmented systems.

The effectiveness of the OVI™ is also due to the fact that it is obviously not available on the international market and that it is being manufactured by just few, strictly controlled, companies.

Moreover, though it were possible to replicate OVI™, specific printing apparatus would be needed to use it, as well as sophisticated technologies such as vacuum-printing. For these reasons, this is the only anti-counterfeiting feature that cannot be replicated on banknotes or documents. The OVI™ used for anti-counterfeiting, when struck by a white light ray (full spectrum, 5,000-7,0000° K), reflects two colours. Variation occurs for incident rays with a value between 30° and 45° of inclination.

Pigments used for producing these inks, generate a typical colour which may be violet, gold, green or red depending on the angle of incidence of the light.

This characteristic allows the identification of banknotes by simply observing them from different angles of observation. It also allows the detection of the above-mentioned inks through the use of special apparatuses.

On the market, today, OVI™ authenticity-analysis instruments can be found, based on qualitative principles which analyse the characteristics of such inks to verify whether they meet the standards of the Mint or of the issuing authority.

A device able to detect the presence of OVI™ is the object of the patent application EP 1.503.904 on behalf of the same applicant, which, compared to the previous technique, has the advantage of being secure, reliable, low-cost and easy to use. Particularly, this device implements the identification of documents marked by OVI™ inks through polarized light. In other words, it takes advantage of a specific physical phenomenon of light reflection and refraction, typical of the OVI™ inks when struck by a polarized light ray. In short, such a device based on the known technique involves:

a light source;

a first polarizing filter placed between the light source and an object marked with OVI™ inks to be identified;

a second polarizing filter, positioned at an appropriate reciprocal angle with respect to the angle of inclination of the incident light, apt to filter and re-polarize the reflected light coming from the marked object, placed between such an object to be identified and a person or an automatic identification system.

Such a device based of the known technique sends a light ray onto the area processed with OVI™ through a first polarizing filter. The reflected light ray is made to pass through a second polarizing filter rotated orthogonally with respect to the first one. Since the light reflected by the area processed with OVI™ maintains the polarization intact, differently from any other process that might have been performed on this area, it will appear completely black to an observer examining it through this second polarizing filter.

Ultimately, the presence of OVI™ will be detected by comparison with the surrounding area which, having reflected the light ray without maintaining the polarization intact, will be visible.

The above-described method, as well as all other methods of the known technique, is of qualitative kind, since it is based on a subjective comparison between an area processed with OVI™ and an area which is not, while it would be advisable having a method and a device which could also provide information of quantitative kind, so to avoid—to the maximum extent possible—that the assessment of the document depends on the subjectivity of the operator. Further, the above-mentioned information of quantitative kind would become very useful if combined with an automatic device for the assessment and counting of banknotes.

The purpose of this invention is to overcome such a limitation of the known technique, proposing a method and a device to implement the above-mentioned method, in compliance with the claims 1 and 6 respectively, apt to examine banknotes and documents processed with OVI™ and to provide a numeric value related both with the authenticity of the document or banknote and with the banknote kind itself or with the institute issuing the document.

According to the method of this invention, the surface processed with OVI™ is illuminated with an inclined polarized light ray, e.g. of 45°. The reflected light ray, obviously at 45°, will be filtered by two coplanar filters. The direction of polarization between these two filters is orthogonal. In particular, the first of these two coplanar filters will be polarized linearly in phase with the incident ray, while the second coplanar filter will be polarized in anti-phase.

To an observer the surface processed with OVI™ will appear divided into two parts:

A first part, corresponding to the reflected ray passing through the filter which is polarized in the same direction the incident ray is, will appear bright, metallic and of a specific colour depending on the OVI™ type used on the banknote or document being examined. Since the OVI™ type is related to the kind of banknote or of document, this data will be related to the currency or to the institute issuing the document. As an example, with Euro will be metallic purple-like, with US dollar will be bright yellow-green-like.

These features are constant and repeat on each non-counterfeited banknote or document.

A second part, corresponding to the reflected ray passing through the filter which is polarized orthogonally with respect to the direction of the incident ray, will appear deep-black since the reflected light ray is bipolarized by a linear polarizing filter in anti-phase (orthogonal polarization position) with respect to the source filter.

According to this invention, the device includes a signal processor which will calculate the difference between these two signals (A). This data will be constant for each currency or single denomination on the assessed surface. (50, 100, 200, 500€ or 20, 50, 100, 1000$). Then, by means of a processor, the data detected on the assessed banknote or document will be compared to data stored into a specific memory or into a database, which correspond to reference values obtained from genuine banknotes.

The final result can eventually be sent to a human machine interface, such an LCD display or an acoustic/optical warning device, or to a machine interface, such a banknote-counter, a personal computer, etc.

It is, therefore, very difficult to counterfeit an OVI™ in such a way that it may generate a signal accepted by this system and, at the same time, it appears similar to the real OVI™, deceiving the final user.

This invention will now be described for explanatory purposes—and not in a limiting way—according to a preferred way of implementation and with reference to the enclosed pictures, where:

Figure 1:
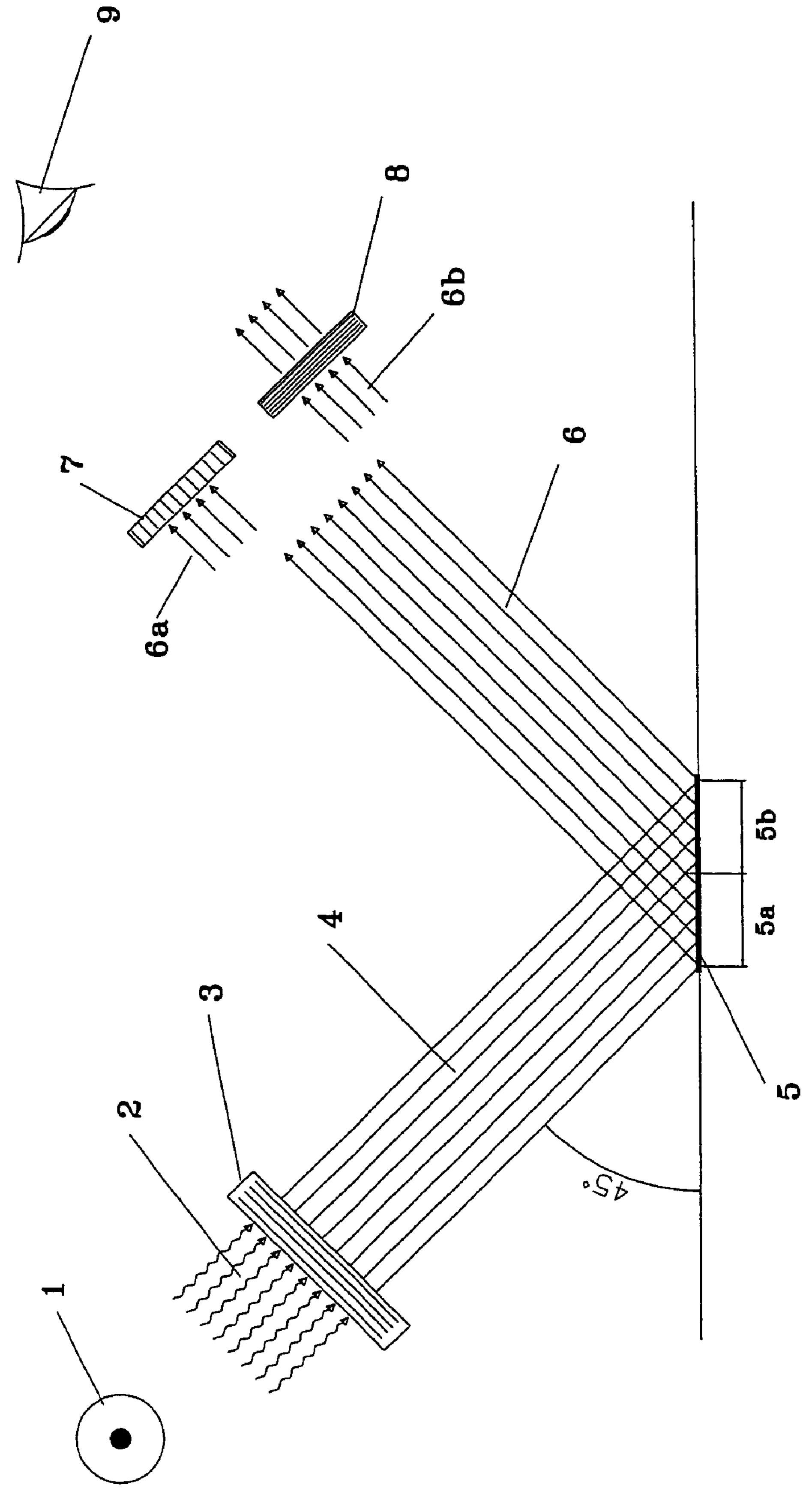
FIG. 1 shows the functioning principle on which the invention method is based.

Referring to FIG. 1, (1) indicates a white light source (full spectrum) between 5,000 and 7,000° K with a light intensity of at least 30,000 mcd. The source (1) emits a luminous ray (2) which passes through a first polarizing filter (3), undergoes a linear polarization (4) and strikes an area (5) at least a part of which (5*a*) is processed with OVI™. The remaining part od area (5) is indicated by (5*b*).

The polarized ray (4) strikes such an area (5) with an inclination, e.g. 450 and is then reflected with the same inclination.

The reflected ray (6) will be polarized as the incident ray (4).

The incident ray (4) strikes the surface on a relatively extended area (5). The part of the incident ray striking the portion (5*a*) of the surface (5), generates a part (6*a*) of the reflected ray (6), while the part of the incident ray striking the portion (5*b*) of the surface (5), generates a part (6*b*) of the reflected ray (6). In practice, the incident ray polarized linearly (4) produces a reflected ray (6) which is made up of two rays (6*a*), (6*b*).

Two polarizing filters (7) and (8) are positioned along the path of the ray (6) reflected by the area (5); the first one (7) is in anti-phase with the first polarizing filter (3), while the second one (8) is in phase consistency with the first polarizing filter (3)

It is to be noted that in the drawings the reflected rays (6*a*) and (6*b*) have been separated for convenience of drawing only.

Of the two rays (6*a*) and (6*b*) which form the form the reflected ray (6), the first one (6*a*), relevant to the portion (5*a*) of the area (5) processed with OVI™, when strikes a second polarizing filter (7) in anti-phase with the above-mentioned first polarizing filter (3) will be blocked. The second (6*b*), instead, relevant to the portion (5*b*) of the area (5), passes.

On the contrary, when the ray (6) strikes a third polarizing filter (8) in phase consistency with the above-mentioned first polarizing filter (3), passes in full. As a consequence of what said above, an observer (9) will perfectly see the part (5*b*) of the area (5) processed with OVI™, while not seeing anything of the part (5*a*) of the area (5) processed with OVI™.

Figure 2:
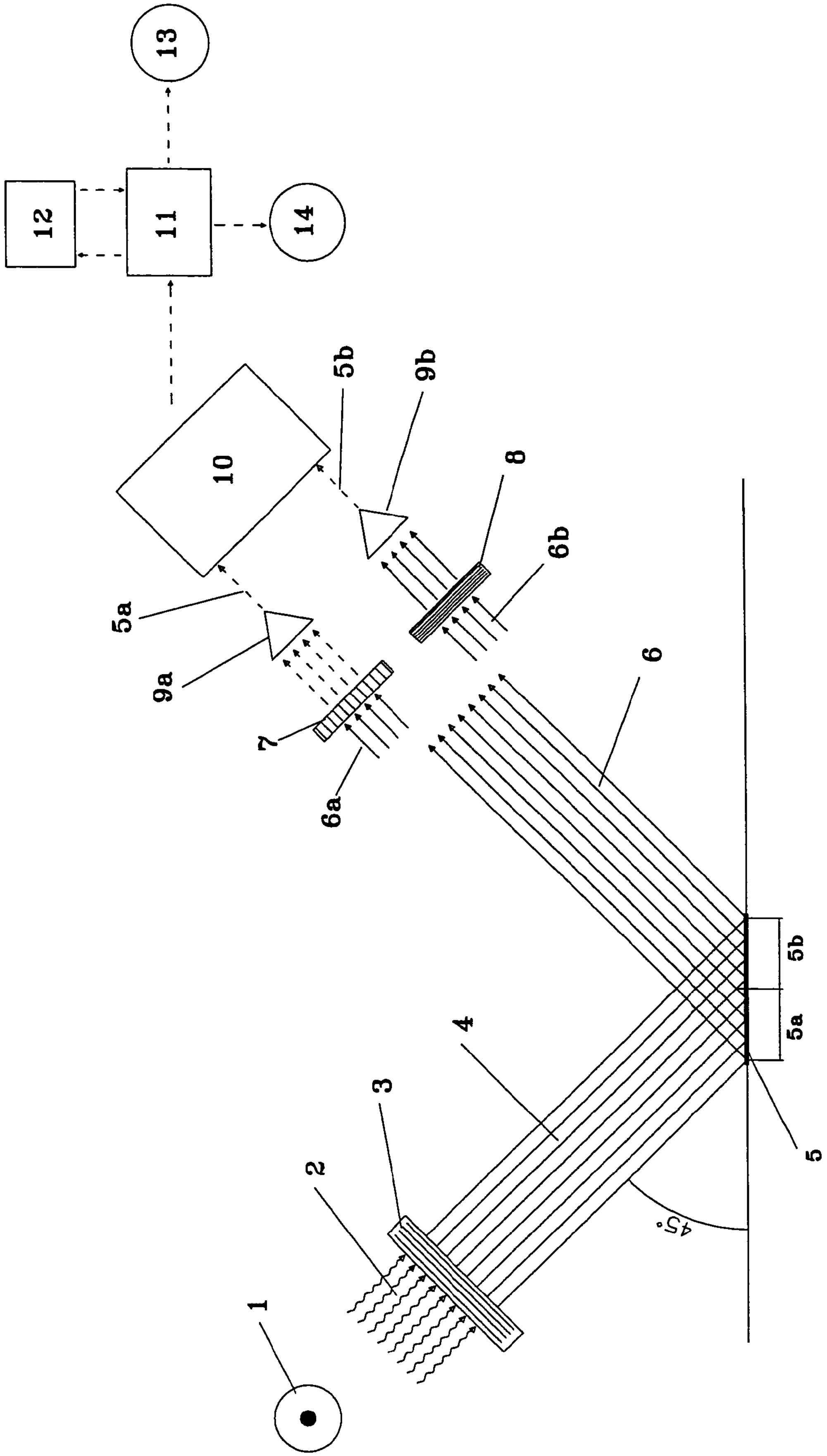
FIG. 2 shows the block diagram of the device based on the invention.

A sensor (9*a*), e.g. a photodiode (FIG. 2), placed in the track of the above-mentioned reflected ray (6*a*) will not detect any presence of light, since the reflected ray polarized linearly (6*a*) was blocked by the second filter (7) in anti-phase.

On the other hand, a sensor (9*b*), e.g. a photodiode, placed in the track of the above-mentioned reflected ray (6*b*) will detect the presence of light and will consequently generate an electrical signal $s_b$.

Obviously, the above will take place when the area (5) is actually processed with OVI™, that is, when the banknote or document is genuine.

In case the area (5) is not processed with OVI™, the reflected light ray (6) would not strictly maintain the polarization, then the reflected ray (6*a*) would not be completely blocked by the second polarizing filter (7) and, in turn, the relevant sensor (9*a*) would generate a signal $s_a$.

The above is completely true when the whole area (5) is processed with OVI™. In reality, since the area processed with OVI™ is relatively small, the area struck by the incident ray (4) will also comprise parts not processed with OVI™.

This means that the reflected ray (6) will not be completely polarized, since it will have been partially reflected by an area not processed with OVI™.

The part (6*b*) of this reflected ray (6) will consequently appear a bit less brighter, both because the area not processed with OVI™ is less reflecting and because it will have been partially blocked by the third polarizing filter (8). The part (6*a*) instead, which is supposed to be completely blocked, will maintain a minimum of luminosity due to the part of the above-mentioned ray (6*a*) not completely polarized which is not blocked by the second polarizing filter (7).

In reality, therefore, also in an area actually processed by OVI™ there will be a reflected ray (6*a*) re-polarized by the second polarizing filter (7) though with a low luminosity.

Moreover, by measuring the luminous intensity also on the part (6*b*) of the reflected ray (6), a lower luminosity will be measured compared to the value of a reflected ray (6) completely polarized. The above means that the difference between the two luminous signals (Δ) is, in reality, inferior to the theoretical value of an area (5) completely processed, since the $s_b$ signal lowers, while the $s_a$ signal is no longer equal to zero.

To reduce the risk of variability of such a measurement, it will be necessary to prepare a suitable template so to have all banknotes/documents to be tested positioned in such a way that the area (5) assessed with the polarized ray (4) may be quite constant. In this way, the difference $\Delta_r$ between the $s_b$ and $s_a$ signals relative to a genuine banknote/document can be measured and taken as reference value.

By carrying out the measurement on banknotes or documents to be assessed through the same template, it will be possible to obtain the value:

$$\Delta = s_b - s_a$$

and compare it to the reference value $\Delta_r$. If Δ differs from $\Delta_r$ of a quantity which can be ascribed to the range of tolerance of the sensors (9*b*) and (9*a*) used, the banknote or document will be considered genuine. On the contrary, they will be considered counterfeit.

A device which is to assess whether banknotes or documents are genuine, implies that the above-mentioned two sensors (9*a*) and (9*b*) are connected to a signal processor (10) for calculating the difference between the signals generated by the sensors (9*a*) and (9*b*). A data processor (11), connected to the above-mentioned signal processor (10), compares the banknote/document's data to the data stored into a database (12) containing the reference values $\Delta_r$ of genuine banknotes and documents. The processor (11) output signal can be sent to a human machine interface (13), i.e. an LCD display or an acoustic/optical warning device, or to a machine interface (14), such as a banknote-counter, a personal computer, etc.

Therefore, the method assessing whether an area is processed with OVI™, purpose of this invention, implies:

generate a white light ray (full spectrum) between 5,000° and 7,000° K, with a light intensity of at least 30,000 mcd;

polarize that white light ray through a first polarizing filter (3), then send the polarized ray (4) onto an area (5) to be assessed;

filter the ray (6) reflected by the area (5) to be assessed by a second polarizing filter (7), in anti-phase with said first polarizing filter (3) and getting a first signal ($s_a$) by measuring its luminous intensity;

filter the ray (6) reflected by the area (5) to be assessed by a third polarizing filter (8), in phase consistency with the first polarizing filter (3), and getting a second signal ($s_b$) by measuring its luminous intensity;

measure the difference $\Delta$ between these two signals;

compare the calculated value $\Delta$ to a reference value $\Delta_r$ previously measured on genuine documents and banknotes.

If the calculated value $\Delta$ differs from the reference value $\Delta_r$ of a quantity which can be ascribed to the range of tolerance of the sensors (9) and (9*a*) used, the banknote or document will be considered genuine. On the contrary, they will be considered counterfeit.

Should the actual presence of OVI™ be detected, the human machine interface (13) can generate an acoustic/optical signal, while a different acoustic/optical signal will be generated in the opposite case.

At the same time, the machine interface (14) will prompt a signal—depending on whether the banknote or document analyzed is authentic—which will be used e.g. by a computer to do the counting of banknotes or the filing of documents.

From the above description, it is clear that using a device based on this invention allows a safe and practical detection of counterfeit banknotes and documents, since it is sufficient to make banknotes or documents pass in front of the polarized light ray, to know—by means of an acoustic/optical signal—whether the banknote or document is genuine or not.

This invention has been described by way of an example—and not in a limiting way—according to a preferred way of implementation. An expert technician in this field will be able to find several other ways of implementation, all of which under the protection of the claims that follow.

The invention claimed is:

1. A method for the identification of banknotes and documents marked with OVI™ inks (Optical Variable Inks), providing the following phases:

generating a light ray;

polarizing that light ray through a first polarizing filter (3), and sending a polarized ray (4) onto a marked area (5) to be assessed;

filtering the ray (6) reflected by the area (5) which is to be assessed by means of a second polarizing filter (7), in anti-phase with the first polarizing filter (3) and measuring the luminous intensity of such a reflected ray (6) already filtered, so getting a first signal $s_a$;

filtering the ray (6) reflected the area (5) to be assessed by means of a third polarizing filter (8), in phase consistency with the first polarizing filter (3), and measuring the luminous intensity of such a reflected ray (6) already filtered, so getting a second signal $s_b$;

measuring the difference $\Delta$ between these two signals $s_b$ and $s_a$;

compare the calculated value $\Delta$ to a reference value $\Delta_r$ previously measured on genuine documents and banknotes.

2. Method, according to claim 1, wherein the light ray is a white light ray with full spectrum (between 5,000 and 7,000° K).

3. Method, according to claim 2, wherein the light ray has an intensity of at least 30,000 mcd.

4. Method, according to claim 1, wherein said reference value $\Delta_r$ is obtained by means of a direct assessment on a genuine banknote or document.

5. Method, according to claim 4, comprising a positioning of the marked area (5) to be assessed, with respect to the above-mentioned polarized incident ray (3), which is the same as the marked area had when measuring the reference value $\Delta_r$.

6. A device for the identification of banknotes and documents marked by OVI™ inks (Optical Variable Inks), comprising:

a light source;

a first polarizing filter (3) placed between the light source and an area to be assessed, the area including a marked area treated with an optical variable ink and an unmarked area;

a second polarizing filter (7), in anti-phase with said first polarizing filter (3) and placed in the track of a ray (6) reflected the area to be assessed;

a third polarizing filter (8), in phase consistency with said first polarizing filter (3) and placed in the track of the ray (6) reflected by the area to be assessed;

a first luminosity sensor (9*a*) in the track of the reflected ray (6) downstream the filter (7) and configured to provide a signal $s_a$; an a second luminosity sensor (9*b*) in the track of the reflected ray (6) downstream the filter (8) configured to provide a signal $s_b$, wherein said first luminosity sensor (9*a*) and said second luminosity sensor (b) are connected to a signal processor (10) configured to calculate a difference $\Delta$ between the signal $s_b$ and the signal $s_a$.

7. The device according to claim 6, wherein said light ray is a white light ray with full spectrum (between 5,000 and 7,000° K).

8. The device according to claim 6, wherein said light ray has an intensity of at least 30,000 mcd.

9. The device according to claim 6, further comprising:

a template for correctly fixing the position of the area to be assessed (5) with respect to a polarized incident ray (4).

10. The device according to claim 6 to claim 6, wherein said first luminosity sensor (9*a*) and said second luminosity sensor (9*b*) are photodiodes.

11. The device according to claim 6, further comprising:

a data processor (11), connected to said signal processor (10), to compare the difference $\Delta$ to data in a database (12) containing reference values $\Delta_r$ of at least one of genuine banknotes and genuine documents.

12. A device for the identification of banknotes or documents marked by OVI™ inks (Optical Variable Inks), the device comprising:

a light source;

a first polarizing filter (3) placed between said light source and a marked area of a banknote or document to be assessed (5);

a second polarizing filter (7), in anti-phase with said first polarizing filter and placed in the track of a ray reflected by the marked area to be assessed (5); and a third polarizing filter (8), in phase consistency with first polarizing filter (3), placed in the track of such a ray (6) reflected by the marked area to be assessed (5);

a first luminosity sensor (9_a_) in the track of the reflected ray (6) downstream the filter (7) and configured to provide a signal $s_a$;

a second luminosity sensor (9_b_) in the track of the reflected ray (6) downstream the filter (8) and configured to provide a signal $s_b$ wherein, said first luminosity sensor (9_a_) and said second luminosity sensor (9_b_) are connected to a signal processor (10) configured to calculate a difference Δ between the signal $s_b$ and the signal $s_a$, and said signal processor (10) is connected to a data processor (11) configured to compare difference Δ with data in a database (12) containing reference values $\Delta_r$ of genuine banknotes or documents.

13. The device according to claim 12, wherein said light ray is a white light ray with full spectrum (between 5,000 and 7,000° K).

14. The device according to claim 12, wherein said light ray has an intensity of at least 30,000 mcd.

15. The device according to claim 12, further comprising: a template for correctly fixing in position, with respect to a polarized incident ray (4), the marked area to be assessed (5).

16. The device according to claim 12, wherein said first luminosity sensor (9_a_) and said second luminosity sensor (9_b_) are photodiodes.

* * * * *